Oct. 20, 1970 — M. D. TREICHLER — 3,534,639
PORTABLE ANGULARLY ADJUSTABLE DRILL PRESS
Filed Sept. 24, 1968 — 2 Sheets-Sheet 2
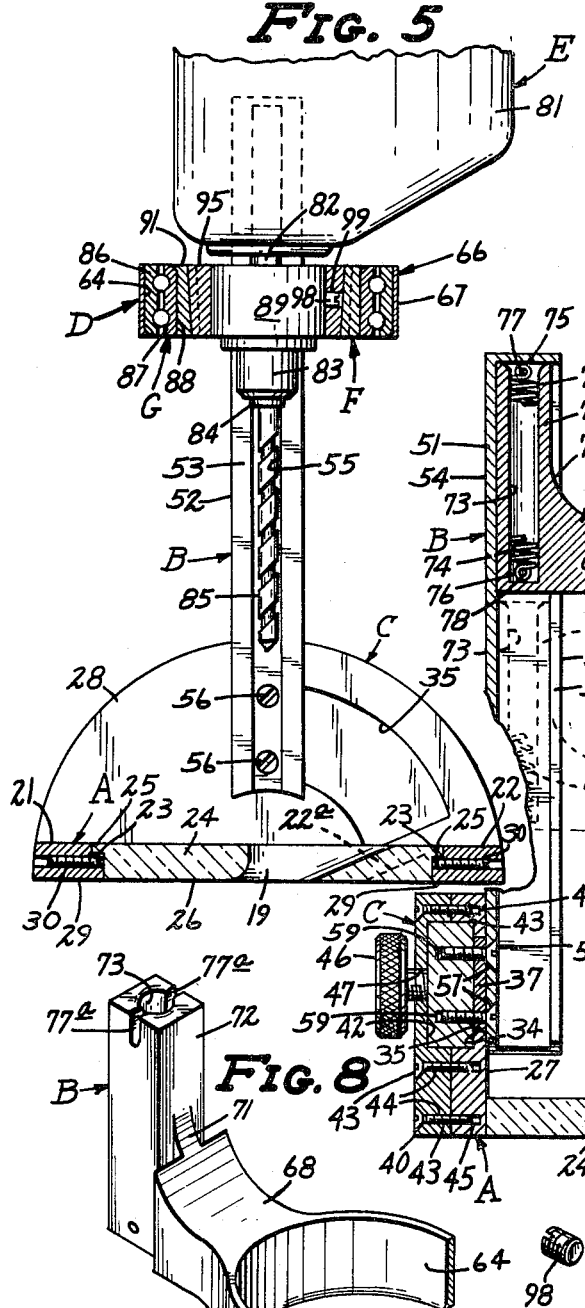
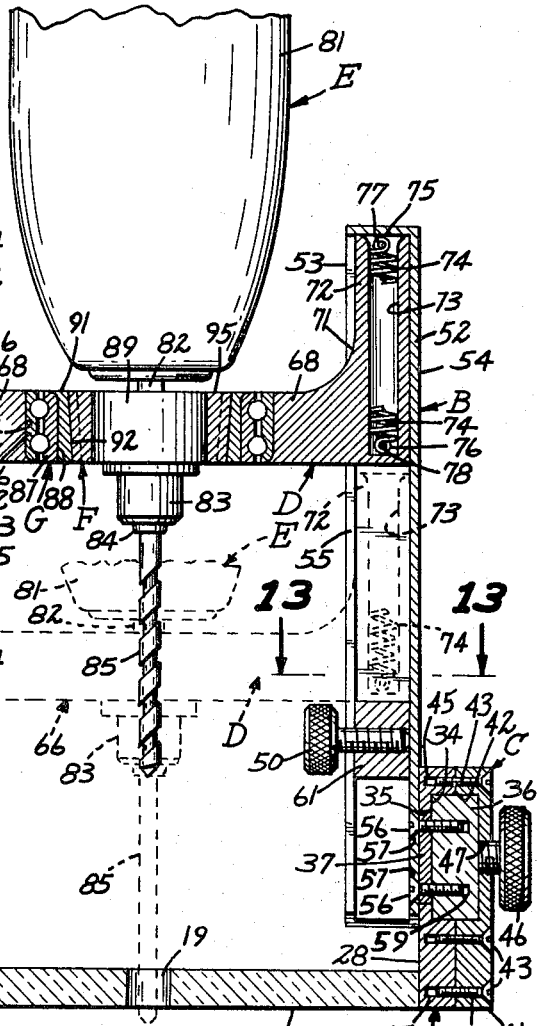
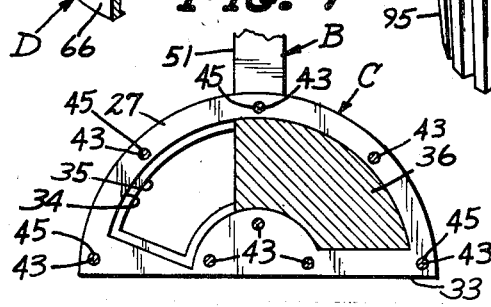
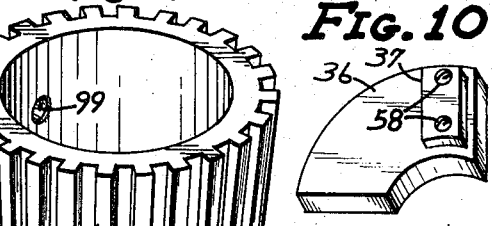
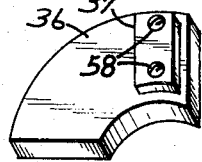
INVENTOR.
MYRON D. TREICHLER
BY
Carlsen, Carlsen, Sturm & Hicks
ATTORNEYS United States Patent Office 3,534,639
Patented Oct. 20, 1970

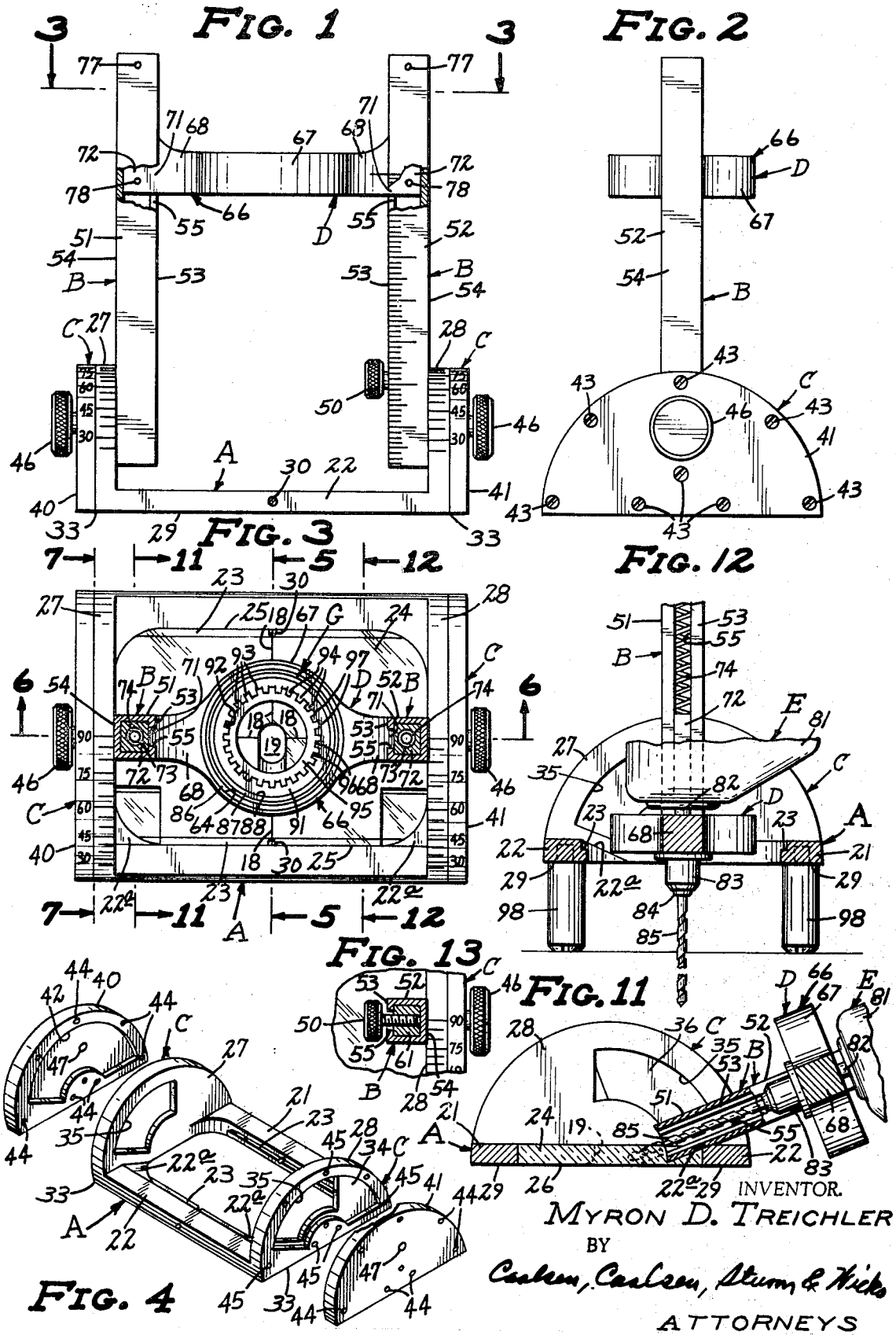

3,534,639
PORTABLE ANGULARLY ADJUSTABLE DRILL PRESS
Myron D. Treichler, 505 W. 53rd St.,
Hibbing, Minn. 55746
Filed Sept. 24, 1968, Ser. No. 762,010
Int. Cl. B23b 45/00, 45/14
U.S. Cl. 77—7                                12 Claims

ABSTRACT OF THE DISCLOSURE

A portable, angularly adjustable drill press utilizing a portable electric hand drill quickly attachable to supporting means and slidably mounted on guide means which are pivoted to a base having a flat surface adapted to engage the surface of the object to be drilled, said guide means being pivoted by segment means having its axis lying in the denoted surface of the base. The supporting means include a bearing with attaching means rotatably mounted by said bearing means and secured to the axially rotatable member of the chuck of the hand drill. The guide means includes stop means for the supporting means to regulate the depth of a drilled hole.

FIELD OF THE INVENTION

Portable drilling machines with detachable motors and with angular adjustment of the drill.

PRIOR ART

Portable drilling machines in which the motor could be removed with difficulty and in which the hole drilled could not be definitely located.

SUMMARY OF THE INVENTION

The instant invention embodies a drill press by which the drill may be adjusted angularly with respect to the base and in which the axis of the drill intersects the surface of the base resting upon the surface of the object to be drilled at a single point regardless of the angular position of the drill relative to said surface. In addition applicant uses a portable electric hand drill which can be easily, quickly and accurately mounted in the drill press without the use of tools and can be used for other purposes, for hand drilling free from the drill press. The drill press may be accurately placed on a flat surface whether horizontal or vertical and holes drilled therein with accuracy at the precise points desired and to the desired depth.

These and other more detailed and specific objects will be disclosed in the course of the following specification, reference being had to the accompanying drawings, in which:

FIG. 1 is a front elevational view of a drill press illustrating an embodiment of the invention and without the hand drill attached.

FIG. 2 is a side elevational view of the structure shown in FIG. 1.

FIG. 3 is a plan view of the structure shown in FIGS. 1 and 2 with the hand drill removed.

FIG. 4 is a perspective view of the base and pivot means of the invention.

FIG. 5 is a sectional view of the drill press with the hand drill attached taken on line 5—5 of FIG. 3 and drawn to a greater scale.

FIG. 6 is a sectional view taken on line 6—6 of FIG. 3.

FIG. 7 is a sectional view taken on line 7—7 of FIG. 3.

FIG. 8 is a perspective view of a part of the supporting means of the invention.

FIG. 9 is a perspective view of part of the attaching means of the invention.

FIG. 10 is a perspective of a portion of the pivot means of the invention.

FIG. 11 is a sectional view of the invention taken on line 11—11 of FIG. 3 and showing the parts in altered position.

FIG. 12 is a sectional view similar to FIG. 5 with the parts in altered position and with the base resting on legs secured to the base and the transparent insert removed, taken on line 12—12 of FIG. 3.

FIG. 13 is a fragmentary sectional view taken on line 13—13 of FIG. 6.

The invention comprises a base A and guide means B extending outwardly therefrom and connected thereto by pivot means C. Supporting means D carries an electric hand drill E which is attached by means of attaching means F to a bearing G mounted on the supporting means D. The attaching means F is secured to the chuck of the hand drill.

The base A consists of a casting having two elongated spaced bars 21 and 22 connected together at their ends by means of end walls 27 and 28 which are integral therewith. The bars 21 and 22 are formed with facing rabbets 23. In these rabbets is mounted a plate-like insert 24 constructed of transparent plastic material which is formed with flanges 25 received in the rabbets 23. The flanges 25 are of such thickness that the outer surface 26 of said plate lies flush with or slightly above the outer surface 29 of the bars 21 and 22. The insert 24 is held in position by means of set screws 30 screwed into the bars 21 and 22.

The end walls 27 and 28 form part of the pivot means C and are semicircular in form, with a diameter 33 lying in the plane of the lower surface 29 of the base A. In the walls 27 and 28 are formed arcuate grooves 34 and within said grooves are arcuate slots 35 of lesser length than the grooves 34 but concentric therewith and extending completely through said end walls. These grooves and slots with the arcuate walls thereof form the segment means of the invention.

Mounted in the grooves 34 are arcuate sliders 36 (FIG. 10) which fit into the grooves 34 and slide about said grooves. These sliders have stops 37 attached thereto and which move in the slots 35 and extend outwardly beyond the inner surfaces of the end walls 27. The stops 37 may be formed integral with the sliders 36. The sliders 36 extend outwardly beyond the outer end walls 27 and 28 and are covered by caps 40 and 41. These caps are similar to the walls 27 and 28 and have arcuate grooves 42 similar to grooves 34, which receive the protruding portions of the sliders 36. These caps are attached to the end walls 27 and 28 by means of screws 43 which pass through drilled holes 44 in said caps and are screwed into tapped holes 45 in the end walls 27 and 28. Knurled headed screws 46 are screwed into threaded holes 47 in the caps 40 and 41 and are adapted to engage the sliders 36 and to lock the same from movement.

The guide means B comprises two rectangular metal tubes 51 and 52 which serve as posts and which have inner facing walls 53 and outer walls 54. In the walls 53 are longitudinal slots 55 which run from end to end of the same. These tubes overlie the stops 37 and are attached to the sliders 36 by screws 56 which extend through countersunk drilled holes 57 in the walls 54 of said tubes, through drilled holes 58 in the stops 37 and are screwed into threaded holes 59 in the sliders 36. The bar 22 is formed with the relieved and angularly disposed arms 22ª upon which the tubes 51 and 52 rest when the same are in the lowermost angular position.

The supporting means D includes a cross head 66 which is cast to form a ring 67 (FIG. 8) in the middle thereof and with arms 68 extending outwardly from the same. These arms at the ends of the same have reduced portions 71 which are adapted to enter the slots 55 in tubes 51 and 52. Integral with the reduced portions 71 are slides 72 which are rectangular in cross section and fit snugly in the tubes 51 and 52 and guide the cross head 66 for sliding movement toward and from the base A. The slides 72 are elongated in form and have bores 73 extending longitudinally within the same. Disposed in these bores are tension coil springs 74 which are formed with loops 75 and 76 at the upper and lower ends thereof. Pins 77 extend through the loops 75, through the slots 77a, and the upper ends of the tubes 51 and 52 and other pins 78 extend through the loops 76 and the lower ends of said guides. By means of this construction the cross head is raised to its uppermost position.

The cross head 66 may be held in adjusted position along the tubes 51 and 52 by means of a thumb screw 50 which extends through the slot 55 in tube 52 and is screwed into a nut 61 slidable within said tube. This screw is adapted to engage the outer wall 54 of said tube and clamp the cross head in adjusted position. The nut 61 serves as a stop for limiting the downward movement of the hand drill E and hence the depth of the hole drilled by the same.

For the purpose of explaining the operation of the invention an electric hand drill E is employed which is best shown in FIG. 6. This drill includes a case 81 in which is housed the usual electric motor and reduction gearing (not shown). A drive shaft 82 extends outwardly from the case 81 and has attached to it a chuck 83. This chuck has jaws 84 which may be closed upon a drill 85 mounted within the same by means of an axially rotatable member 89 of the chuck.

The ring 67 of cross head 66 is formed with a bore 64 which receives by means of a press fit the outer race 86 of the ball bearing G. The inner race of said ball bearing is indicated by the reference numeral 87 and has in it a bore 88.

The attaching means F comprises a bushing 91 which is received in the bore 88 of race 87 and held in place therein by means of a press fit therebetween. The race 87 of bearing G and the bushing 91 constitute journal means rotatable in the bearing. This bushing has a bore 92 (FIG. 3) serving as a socket and formed with longitudinally extending flutes 93 serving as keyways and providing keys 94 therebetween. Encircling the axial rotatable member 89 of chuck 83 is a sleeve 95 which is attached to said member by means of a set screw 98 screwed into a tapped hole 99 in said sleeve. This sleeve has on the exterior surface thereof flutes 96 which receive the keys 94 on bushing 91 and keys 97 which are received into the flutes 93 of said bushing. Both the flutes and keys of the bushing 91 and sleeve 95 are disposed in conical relation so that play between said bushing and sleeve is eliminated when the parts are urged together.

The plate 24 is formed with an opening 19 through which the drill 85 may extend. In addition cross marks 18 are formed on the bottom surface of the plate 84 which indicate the point where the axis of the drill 85 intersects the plans of the surface 29 of the base A.

The use of the invention is as follows: The hand drill 81 is first removed from the drill press and a drill of proper diameter and length chucked in the chuck 83 by rotating the rotating member 89. The hand drill 81 is then replaced with the sleeve 95 inserted in the bushing 91 and with the keys and flutes intermeshing. The thumb screws 46 are turned to disengage the sliders 36, permitting angular adjustment of the hand drill and the parts attached thereto. When the correct angular position is reached the screws 46 are tightened to clamp the hand drill E in position. Then the thumb screw 50 is loosened and the hand drill E with attached parts moved toward the base A until the drill 85 protrudes beyond the plate 24 sufficiently to drill a hole of the desired depth. Screw 50 is then tightened and the hand drill brought back to normal position by springs 74. By now placing the drill press on the object to be drilled and centering the drill by means of cross lines 18 to the locality where the hole is to be drilled, drilling may be done in the customary manner. The sleeve 95 need not be removed when the drill motor is used for functions other than drilling or when a different drill is replaced in chuck 83.

The advantages of the invention are manifest. The hole can be drilled at the exact location desired regardless of the angle of the hole with reference to the surface through which it is to be extended. The hand drill can be quickly removed without using tools to permit other uses. The hand drill being attached to the supporting structure by a bearing in which the chuck is mounted, the handle of the hand drill may be turned to a suitable working position without moving the base. The drill press may be used with different types of hand drills. The drill press is sturdy in construction and accurate in operation. Further provided are the legs 98 which may be removably secured to the base A in spaced relation by screws or other means well known in the art. With the plate 24 removed and with the legs in place the bit 85 can descend below the lower limit of the base A.

I claim:
1. In a portable angularly adjustable drill press utilizing a portable electric hand drill having a chuck with an axially rotatable member for tightening the drill, the combination of
   (a) a base having a flat outer surface adapted to rest on the surface of the object to be drilled;
   (b) guide means extending outwardly from said base,
   (c) pivot means between said guide means and base having its axis extending along the denoted surface of said base,
   (d) supporting means carried by said guide means,
   (e) slide means on said supporting means engaging said guide means and guiding the supporting means for movement toward or from the base,
   (f) a bearing in said supporting means having its axis at right angles to the axis of the pivot means,
   (g) journal means rotatably mounted by said bearing and
   (h) attaching means acting between the axially rotatable member of the portable electric hand drill and the journal means for detachably securing the hand drill to the journal means.

2. The structure according to claim 1 in which the axis of the pivot means between the base and guide means lies in the denoted surface of the base.

3. The structure according to claim 1 in which
   (a) the pivot means between the base and guide means consists of segment means issuing from the base and
   (b) slider means carried by said guide means and engaging said segment means.

4. The structure according to claim 1 in which the guide means consists of two spaced posts and between which the portable electric hand drill is disposed.

5. The structure according to claim 4 in which the axis of the chuck of the portable electric hand drill lies in the medial plane of the posts of the guide means.

6. The structure according to claim 1 in which
   (a) the attaching means includes
   (b) a bushing having
   (c) a socket therein,
   (d) a sleeve encircling said chuck and disposed in said socket and
   (e) restraining means acting between the bushing and sleeve to prevent relative rotational movement therebetween.

7. The structure according to claim 6 in which said restraining means includes
   (a) a substantially longitudinal keyway formed in said bushing at said socket and (b) a key on said sleeve fixed relative thereto and adapted to enter said keyway to prevent relative rotation between said bushing and sleeve.

8. The structure according to claim 6 in which said restraining means comprises
   (a) spaced substantially longitudinally extending keyways in the bushing and
   (b) spaced keys therebetween and
   (c) spaced substantially longitudinally extending keyways in the sleeve adapted to receive the keys of the bushing and
   (d) spaced keys therebetween adapted to enter the keyways in the bushing.

9. The structure according to claim 6 in which
   (a) the socket is conical in form and
   (b) the sleeve is also conical in form and adapted to snugly fit into the socket.

10. The structure according to claim 5 in which
    (a) the base has a transparent insert with
    (b) a hole therein through which the drill extends and
    (c) cross marks on said insert denoting the intersection of axis of the drill and the plane of the outer surface of the base.

11. The structure according to claim 1 in which said guide means carries stop means for said supporting means to list the depth of the hole made by a drill mounted in the chuck of the hand drill.

12. The structure according to claim 10 in which said base has leg means removably attached thereto for use without said transparent insert.

References Cited

UNITED STATES PATENTS

| | | | |
|---|---|---|---|
| 1,470,143 | 10/1923 | Buterbaugh | 77—31 XR |
| 2,622,458 | 12/1952 | Jenkins | 77—55 |

FRANCIS S. HUSAR, Primary Examiner.

U.S. Cl. X.R.

77—31, 55